US011040731B2

(12) United States Patent
Hall (10) Patent No.: US 11,040,731 B2
(45) Date of Patent: Jun. 22, 2021

(54) PASSENGER RESTRAINT WITH INTEGRATED LIGHTING

(71) Applicant: Universal City Studios LLC, Universal City, CA (US)

(72) Inventor: Gregory S. Hall, Orlando, FL (US)

(73) Assignee: Universal Studios LLC, Universal City, CA (US)

(*) Notice: Subject to any disclaimer, the term of this patent is extended or adjusted under 35 U.S.C. 154(b) by 245 days.

(21) Appl. No.: 15/963,789

(22) Filed: Apr. 26, 2018

(65) Prior Publication Data

US 2018/0312173 A1 Nov. 1, 2018

Related U.S. Application Data

(60) Provisional application No. 62/492,128, filed on Apr. 29, 2017.

(51) Int. Cl.
| | |
|---|---|
| *B61D 29/00* | (2006.01) |
| *B61D 33/00* | (2006.01) |
| *A63G 31/00* | (2006.01) |
| *B61L 15/00* | (2006.01) |
| *B60R 22/48* | (2006.01) |
| *A63G 7/00* | (2006.01) |
| *B60R 21/02* | (2006.01) |
| *B60R 21/00* | (2006.01) |

(52) U.S. Cl.
CPC ............... *B61D 29/00* (2013.01); *A63G 7/00* (2013.01); *A63G 31/00* (2013.01); *B60R 21/02* (2013.01); *B60R 22/48* (2013.01); *B61D 33/0092* (2013.01); *B61L 15/0072* (2013.01); *B60R 2021/0097* (2013.01); *B60R 2022/4816* (2013.01); *B60R 2022/4866* (2013.01)

(58) Field of Classification Search
CPC ...................................................... B61D 29/00
USPC ........................................................... 701/19
See application file for complete search history.

(56) References Cited

U.S. PATENT DOCUMENTS

| 4,849,733 A * | 7/1989 | Conigliaro | .............. B60R 22/48 |
| | | | 340/457.1 |
| 8,952,801 B2 * | 2/2015 | Larice | ...................... B60Q 9/00 |
| | | | 340/457.1 |

(Continued)

FOREIGN PATENT DOCUMENTS

DE 102010014368 A1 * 10/2010 ............. B60R 22/12

OTHER PUBLICATIONS

English translation of DE102010014368A1 from google patents (Dec. 8, 2018).*

(Continued)

*Primary Examiner* — Jean Paul Cass
(74) *Attorney, Agent, or Firm* — Fletcher Yoder P.C.

(57) ABSTRACT

Present systems and methods are directed to a passenger restraining system, which includes a restraint and a locking mechanism, and a lighting system, which includes a variety of light sources. At least a portion of the variety of light sources is integrated with the restraint. Furthermore, the lighting system receives an indication of a configuration of the locking mechanism, executes a first light scheme via the plurality of light sources when the indication is of an unlocked configuration, and executes a second light scheme via the plurality of light sources when the indication is of a locked configuration.

23 Claims, 7 Drawing Sheets

(56) References Cited

U.S. PATENT DOCUMENTS

| | | | | |
|---|---|---|---|---|
| 2005/0145430 A1* | 7/2005 | Smith | ............ | B60R 22/48 |
| | | | | 180/268 |
| 2007/0182534 A1* | 8/2007 | Gregory | ............ | B60R 22/48 |
| | | | | 340/457.1 |
| 2008/0303260 A1 | 12/2008 | Jaskol et al. | | |
| 2009/0093932 A1* | 4/2009 | McCall | ............ | B60R 22/48 |
| | | | | 701/45 |
| 2011/0132950 A1* | 6/2011 | Culver | ............ | B60R 11/0241 |
| | | | | 224/485 |
| 2011/0254705 A1* | 10/2011 | Hashberger | ............ | B64D 11/003 |
| | | | | 340/945 |
| 2013/0307382 A1* | 11/2013 | Garrison | ............ | G07F 9/105 |
| | | | | 312/215 |
| 2013/0334802 A1* | 12/2013 | Faughn | ............ | B60Q 3/242 |
| | | | | 280/801.1 |
| 2015/0251619 A1 | 9/2015 | Sutherland | | |
| 2016/0096475 A1* | 4/2016 | Wolfe | ............ | B60Q 1/2611 |
| | | | | 381/59 |

OTHER PUBLICATIONS

Google translation of Chinese Pat. Pub. No. CN 151 3708A (downloaded on May 29, 2018).*
PCT/US2018/029894 International Search Report and Written Opinion dated Jul. 6, 2018.

* cited by examiner

PASSENGER RESTRAINT WITH INTEGRATED LIGHTING

CROSS-REFERENCE TO RELATED APPLICATIONS

This application claims the benefit of U.S. Provisional Application No. 62/492,128 entitled "PASSENGER RESTRAINT WITH INTEGRATED LIGHTING," filed Apr. 29, 2017, which is hereby incorporated by reference in its entirety for all intents and purposes.

BACKGROUND

The present disclosure relates generally to amusement park-style rides, and more specifically to systems and methods for securing guests inside the amusement park-style rides.

Most amusement park-style rides include a ride vehicle that carries passengers along a ride path, for example a track. Over the course of the ride, the ride path may include a number of features, including tunnels, turns, ups, downs, loops, and so forth. Even though a typical amusement park ride that includes a combination of these and other features may only last a few minutes, while the ride is operating, riders may be subject to forces that may move them out of proper positioning or orientation within the ride vehicle. Accordingly, it is desirable to restrain riders while the ride is in operation.

Additionally, it may be beneficial for an amusement park operator (e.g., worker) to inspect the passengers to confirm proper activation of restraints before the ride vehicle is approved for launch along the ride path. However, it is now recognized that aspects of manual inspection by amusement park workers to ensure that the ride passengers are properly secured (e.g., via a restraining system) may cause delays due to inefficiencies that may be overcome by present embodiments.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment, a system includes a passenger restraining system and a lighting system. The passenger restraining system includes a restraint and a locking mechanism. The lighting system includes a plurality of light sources, such that at least a portion of the plurality of light sources are integrated with the restraint. Furthermore, the lighting system operates to receive an indication of a configuration of the locking mechanism, execute a first light scheme via the plurality of light sources when the indication is of an unlocked configuration, and execute a second light scheme via the plurality of light sources when the indication is of a locked configuration.

In accordance with an embodiment, a method includes receiving a locking indication from a restraining system of a ride vehicle, which operates in a ride system. The method further includes determining whether the restraining system is in a locked configuration or an unlocked configuration based on the locking indication, executing a first light scheme via a plurality of light emitters integrated with a restraint of the restraining system in response to determining that the restraining system is in the unlocked configuration, and executing a second light scheme via the plurality of light emitters integrated with the restraint of the restraining system in response to determining the restraining system is in the locked configuration.

In accordance with an embodiment, a control system includes a restraining system that includes a locking mechanism and a restraint. The control system also includes a lighting system that includes a plurality of light sources integrated with the restraint of the restraining system. Further, the control system includes a controller that includes one or more processors and a memory device storing instructions, such that the instructions when executed by the one or more processors cause the one or more processors to receive a locking indication of a locking configuration of the restraining system, instruct the lighting system to execute a first light scheme via the plurality of light sources in response to determining that the restraining system is in an unlocked configuration based on the locking indication, and instruct the lighting system to execute a second light scheme, via the plurality of light sources, in response to determining that the restraining system is in a locked configuration based on the locking indication.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Typical amusement park ride systems (e.g., roller coasters, dark rides, bumper cars) include one or more ride vehicles that follow a ride path (e.g., a track) through a series of features. These features may include tunnels, turns, ups, downs, loops, and the like. Because the ride vehicles often travel at high speeds and traverse along non-linear paths, passengers riding inside the ride vehicles may experience forces that may contribute to undesired movement of the passengers, especially if the passengers are not secured to the ride vehicle. Accordingly, it is desirable to restrain (e.g., secure) the passenger while the ride system is in operation.

While the following discussion is generally provided in the context of ride systems in amusement park rides for use in certain entertainment applications, the provision of examples and explanations in such a context is only to facilitate explanation by providing instances of real-world implementations and applications. Indeed, the lighting system and restraining systems discussed herein may render unique benefits not only for the ride systems, but also for transportation systems, aeronautical systems, virtual-reality (VR) systems, and motor vehicle systems, to name a few examples.

With the foregoing in mind, in certain ride systems, typically, an operator (e.g., amusement park worker) visually inspects passengers and/or pulls on the restraining systems of the passengers to verify proper activation of the restraining systems before the ride vehicle is approved for operation (e.g., launch along the ride path). However, aspects of manual inspection by operators to ensure that the passengers are properly secured via a restraining system may cause delays due to inefficiencies that may be overcome by present embodiments. For example, the present embodiments may be used in addition to the manual inspection to add redundancy to and increase the efficiency of the techniques used to verify proper activation of the restraining system.

As discussed in detail below, in an embodiment, a restraining system may be used to restrain one or more passengers to a ride vehicle. The restraining system may be engaged into a plurality of engagement positions to accommodate passengers of varying body shapes and body sizes. In an embodiment, the restraining system includes a lighting system that is recessed into the restraining system. The lighting system may include a variety of light sources (e.g., fiber optics sources, projectors, and light-emitting diodes (LEDs)) that emit light having various characteristics (e.g., color, brightness, and temperature) based on various configurations of the restraining system. For example, when the restraining system is in an unlocked configuration, the lighting system may execute a first light scheme to indicate to the operators that the corresponding passenger is not secured to the restraining system. Alternatively, when restraining system is in a locked configuration, the lighting system may execute a second light scheme to indicate to the operators that the corresponding passenger is secured to the restraining system.

Additionally, when activated (e.g., turned on) the lighting system may execute a light show that adds to the theming of the ride system. For example, the lighting system may emit light that substantially matches music playing in the background of the ride system. The emitted light may be of a color that matches the theming associated with the ride system.

Accordingly, the embodiments disclosed herein may enhance the overall theming of ride systems by incorporating lighting systems into the restraining system, further enhancing the passenger experience. In addition, the lighting system may serve as an additional verification that the restraining system is properly activated (e.g., in a locked configuration) prior to operating the ride system and driving the ride vehicle. By using the systems and techniques described herein to enhance efficient operation and status verification of restraining systems, more throughput of rides can be achieved and other efficiencies of operation.

Figure 1:
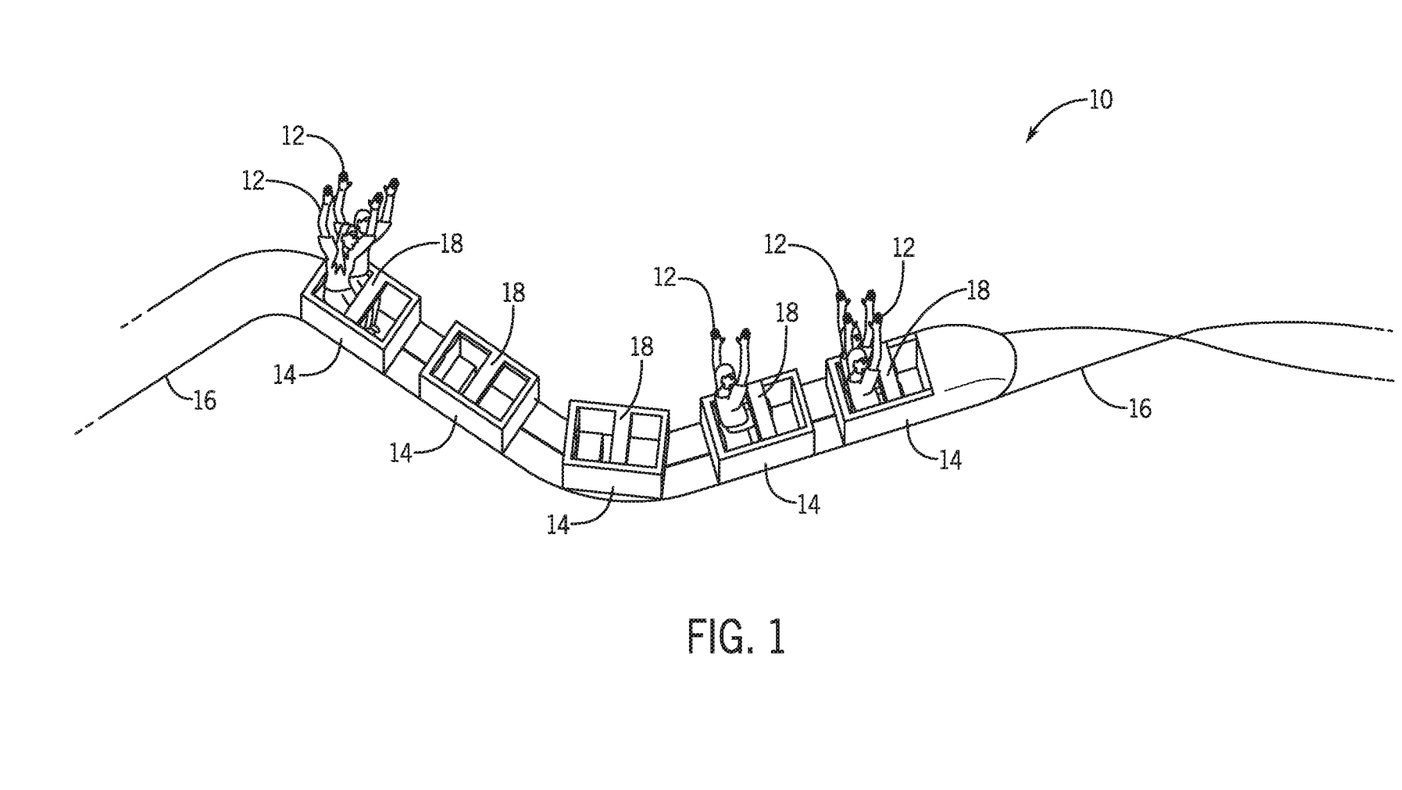
FIG. 1 depicts a side perspective view of an embodiment of a ride system, in accordance with aspects of the present disclosure.

FIG. 1 depicts a side perspective view of an embodiment of a ride system 10 in accordance with aspects of the present disclosure. The ride system 10 may include a ride vehicle 14 that holds one or more passengers 12. In an embodiment, multiple ride vehicles 14 may be coupled together (e.g., by a linkage). In an embodiment, the ride vehicle 14 travels along a ride path 16. The ride path 16 may be any surface on which the ride vehicle 14 travels. In an embodiment, the ride path 16 may be a track. The ride path 16 may or may not dictate the path traveled by the ride vehicle 14. That is, in an embodiment, the ride path 16 may control the movement (e.g., direction, speed, and/or orientation) of the ride vehicle 14 as it progresses, similar to a train on train tracks. In another embodiment, there may be a system for controlling the path taken by the ride vehicle 14. For example, the ride path 16 may be an open surface that allows the passengers 12 to control certain aspects of the movement of the ride vehicle 14 via a control system resident on the ride vehicle 14. Alternatively or additionally, the control system may be resident on the open surface, such that the passenger 12 may control the open surface to maneuver the ride vehicle 14 at a target trajectory.

Furthermore, the ride system 10 may include ride vehicles 14 that may accommodate any number of ride passengers 12. For example, the illustrated embodiment shows five ride vehicles 14 that each accommodate two ride passengers 12. In another embodiment, the ride system 10 may include any number of ride vehicles 14. For example, the ride system 10 may include two, four, ten, twenty, or any number of ride vehicles 14, and each ride vehicle 14 may accommodate various ranges of passengers 12. For example, a first ride vehicle 14 may accommodate two passengers, a second ride vehicle 14 may accommodate four passengers 12, a third ride vehicle 14 may accommodate six passengers 12, and further ride vehicles 14 may accommodate any suitable numbers of passengers 12.

As discussed in detail below, the ride vehicle 14 may include a restraining system 18 with lighting features, as discussed below. In an embodiment, the restraining system 18 may be positioned above the lap of a passenger 12, such that the restraining system 18 exerts a force on the lap of the passenger 12 to secure the passenger 12 to the ride vehicle 14. In an embodiment, the restraining system 18 includes a torso harness that pulls over the shoulders of the passenger to secure their upper body relative to corresponding seating.

It should be noted that any suitable restraining system may be utilized. For example, the restraining system may include an overhead restraining mechanism that may fit over a head of the passenger, such that the restraining system exerts a force on the ride passenger. The force may have a vertical vector component that executes a downward component of force on the ride passenger and a longitudinal vector component that executes a longitudinal component of force against a torso of the ride passenger.

Figure 2:
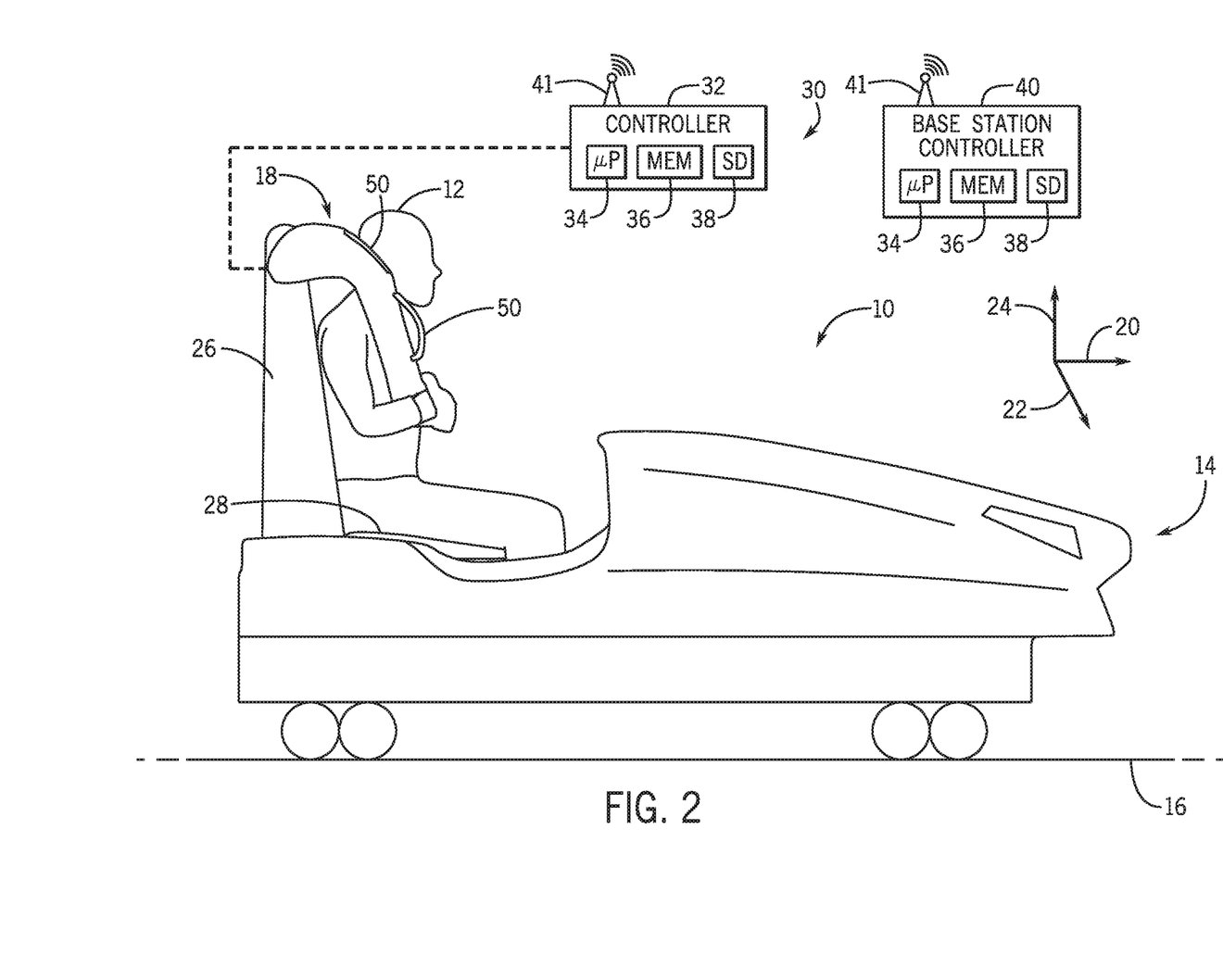
FIG. 2 depicts a side perspective view of an embodiment of a ride vehicle of the ride system of FIG. 1, in accordance with aspects of the present disclosure.

FIG. 2 depicts a side perspective view of an embodiment of a ride vehicle 14 of the ride system 10 of FIG. 1, in accordance with aspects of the present disclosure. The passenger 12 may sit inside the ride vehicle 14 and be secured via the restraining system 18, while the ride vehicle 14 travels along path 16 oriented substantially parallel with a longitudinal axis 20 (e.g., direction of travel). In an embodiment, the restraining system 18 may exert a force on the passenger 12 along the longitudinal axis 20, a lateral axis 22, a vertical axis 24, or any combination thereof. As such, the restraining system 18 may supply a force that secures the passenger 12 to the seat 28 and the back rest 26. For example, the passenger 12 may sit in the ride vehicle 14 such that the back of the passenger 12 is pressed up against the back rest 26 via the restraining system 18. In an embodiment, the back rest 26 and the seat 28 may be made of a padded material such as (e.g., polyurethane) foam, cotton, rubber, and the like.

In an embodiment, the ride system 10 includes a control system 30. In an embodiment, the control system includes a controller 32. Each ride vehicle 14 may be associated with a respective controller 32. In an embodiment, the controller 32 may be a central controller that controls numerous ride vehicles 14. The controller 32 may include a processor 34, a memory device 36, and a storage device 38. In an embodiment, the controller 32 may be incorporated into the restraining system 18.

It should be noted that the ride system 10 may include a base station controller 40 that may facilitate the control of the control system 30. The base station controller 40 may include a processor 34, a memory device 36, and storage device 38. In an embodiment, the controller 32 and the base station controller 40 may be communicatively coupled via respective transceivers 41 that enable wireless communication across any suitable protocol. In another embodiment, the base station controller 40 and the controller 32 are communicatively coupled via a wired (e.g., landline) connection. The controller 32 and/or the base station controller 40 may serve as a quality check point, whereby the conditions of the ride system 10 are monitored. For example, the base station controller 40 may receive data from the controller 32, sensors on the ride vehicles 14, and the like, to determine whether the restraining system 18 is in a locked configuration or unlocked configuration. Furthermore, an operator of the base station controller 40 may manually control the speed of the ride vehicle 14, the duration of the ride system 10, the light characteristics of the lighting system, among other suitable aspects of the ride system 10.

The processor 34 of one or both of the controller 32 and base station controller 40 may be used to execute software, such as software for locking the restraining system 18, employing the lighting system, and for unlocking the restraining system 18. Furthermore, the processor 34 may determine a start and end time associated with the ride system 10. The processor 34 may include multiple microprocessors, one or more "general-purpose" microprocessors, one or more special-purpose microprocessors, and/or one or more application specific integrated circuits (ASICS), or some combination thereof. For example, the processor 34 may include one or more reduced instruction set (RISC) processors.

The memory device 36 may include a volatile memory, such as random access memory (RAM), and/or a nonvolatile memory, such as ROM. The memory device 36 may store a variety of information and may be used for various purposes. For example, the memory device 36 may store processor-executable instructions (e.g., firmware or software) for the processor 34 to execute, such as instructions for locking the restraining system 18, employing the lighting system, executing various light schemes, and unlocking the restraining system 18. In an embodiment, the instructions stored in the memory device 36 may cause the processor 34 to control the characteristics of the light emitted by the lighting system.

The storage device(s) 38 (e.g., nonvolatile storage) may include read-only memory (ROM), flash memory, a hard drive, or any other suitable optical, magnetic, or solid-state storage medium, or a combination thereof. The storage device(s) 46 may store data (e.g., maintenance data, position data associated with the ride vehicle 14, and ride duration data), instructions (e.g., software or firmware for locking and unlocking the restraining system, emitting light via the lighting system, and operating the ride vehicle 14), and any other suitable information.

In an embodiment, when the controller 32 determines that the restraining system 18 is locked (e.g., such that the passenger 12 is secured to the ride vehicle 14), the controller may activate the lighting system 50 to emit a light. In an embodiment, the controller 32 is incorporated into the lighting system 50. In an embodiment, when the controller 32 receives a first indication (e.g., a sensor signal) that the restraining system 18 is not locked, the control lighting system 50 may not emit the light (e.g., remain off). Alternatively or additionally, while the controller 32 does not receive any indication that the restraining system 18 is locked, the controller 32 may cause the lighting system 50 to not emit the light. When the controller 32 receives a second indication (e.g., sensor signal) that the restraining system 18 is locked, the controller 32 may send a second signal to the lighting system 50 to cause the lighting system 50 to emit a light. In an embodiment, the lighting system 50 is incorporated into handles (e.g., via fiber optics) that also function to allow an operator to manually test engagement of the restraining system 18 by grabbing and pulling/pushing on the restraining system 18. In another embodiment, the lighting system 50 may be recessed into the restraining system 18, such that emitted light is not directly viewable by the passenger 12.

Figure 3:
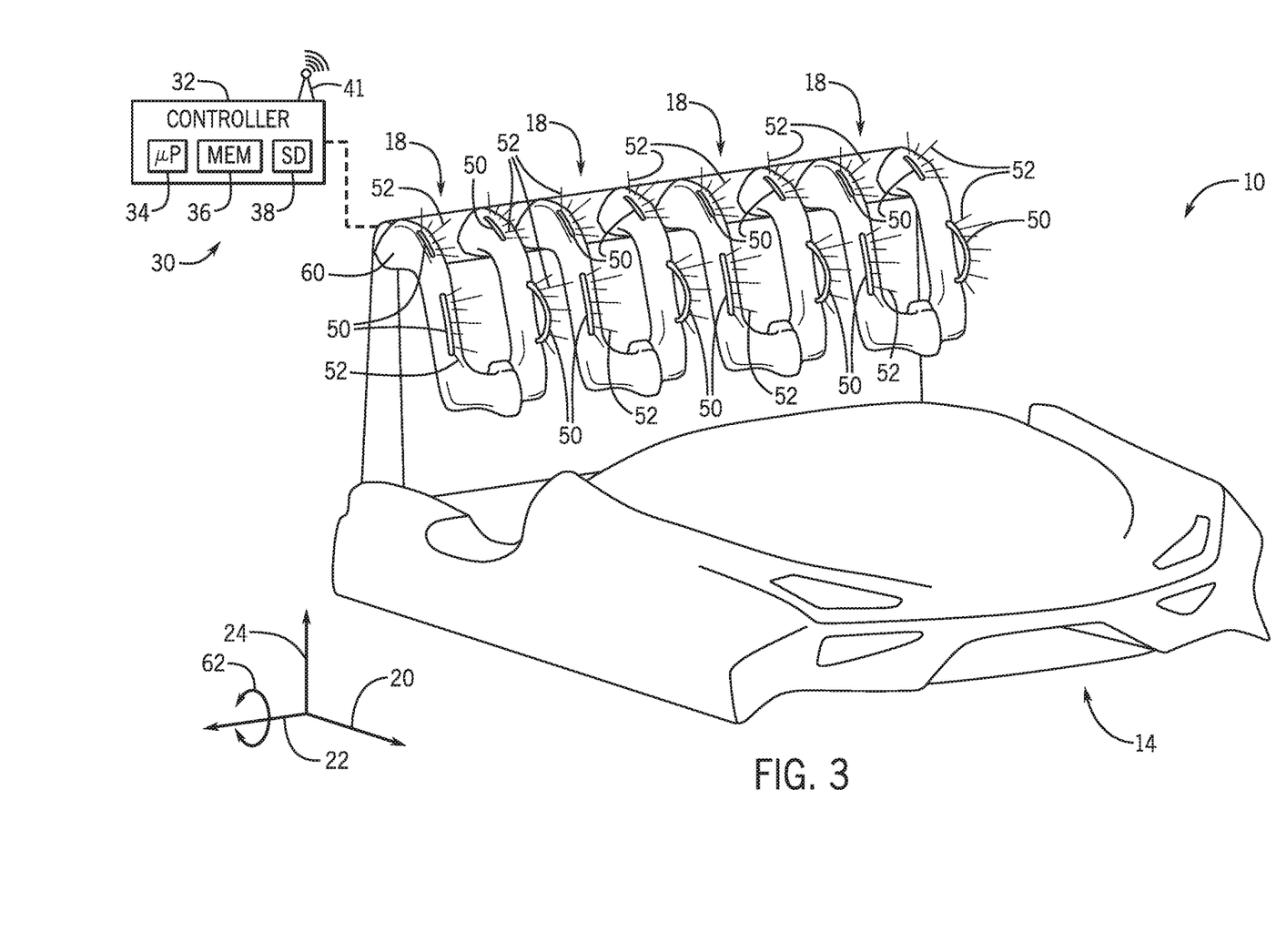
FIG. 3 depicts a perspective view of an embodiment of a ride vehicle of the ride system of FIG. 1 employing a restraining system in a locked configuration, in accordance with aspects of the present disclosure.
Figure 4:
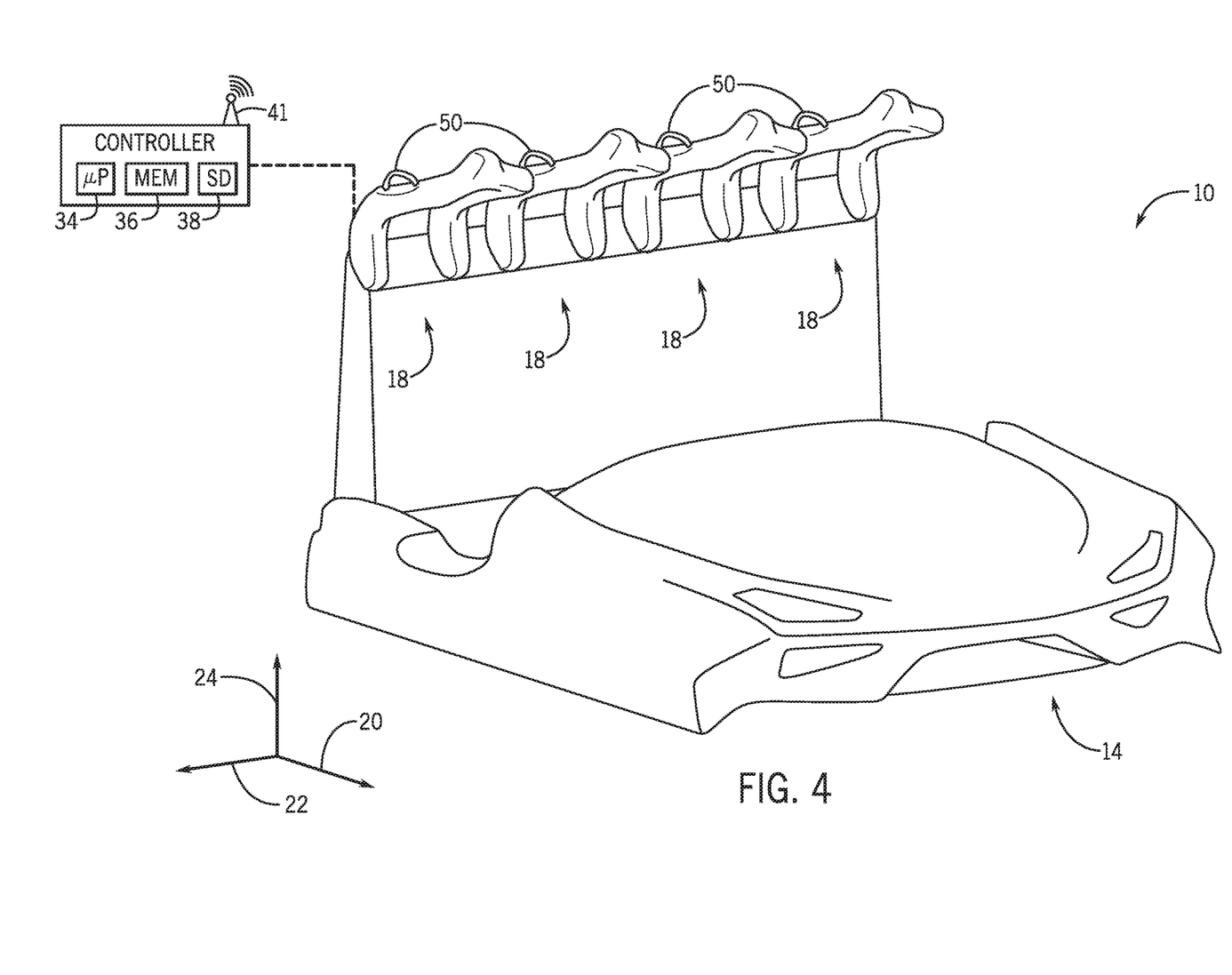
FIG. 4 depicts a perspective view of an embodiment of a ride vehicle of the ride system of FIG. 1 employing the restraining system of FIG. 3 in an unlocked configuration, in accordance with aspects of the present disclosure.

FIG. 3 depicts a perspective view of an embodiment of a ride vehicle 14 of the ride system 10 of FIG. 1 employing a restraining system 18 in a locked configuration, in accordance with aspects of the present disclosure. Furthermore, in the illustrated embodiment, four restraining systems 18 are aligned along the lateral axis 22, such that each restraining system 18 may secure one ride passenger 12 to the ride vehicle 14. In an embodiment, each of the restraining systems 18 may lock independently of one another. For example, one restraining system 18 may remain upright (e.g., as illustrated in FIG. 4) in an unlocked configuration, while other restraining systems 18 may be oriented downward in a locked configuration (e.g., as illustrated in FIG. 3). In an embodiment, when the restraining systems 18 are in the locked configuration, they may emit a light 52 via the lighting system 50.

The lighting system 50 may include various light sources. For example, the lighting system 50 may include compact fluorescent (CFL) light bulbs, light emitting diode (LED) light bulbs, halogen light bulbs, fluorescent light bulbs, high intensity discharge (HID) bulbs, projector devices, and/or any suitable light that emits light 52. The light 52 may be of any suitable color, brightness, and temperature. In an embodiment, the light 52 may match the overall theme of the ride vehicle 14. For example, for a green ride vehicle 14, the emitted light 52 may also be a green color. In an embodiment, a portion of the lighting systems 50 may emit different colors or lights 52 of various brightness and temperatures. For example, a first lighting system may emit a bright yellow light, while a second lighting system may emit a dark green light.

In an embodiment, the lighting system 50 may execute special effects. For example, the emitted light 52 may blink with the rhythm of music (e.g., when the restraining system 18 is in the locked configuration). In an embodiment, the light system 50 may include a projector to display an image in front of the passenger 12 (FIG. 1-2). Varying light characteristics (e.g., color, brightness, and temperature) may be utilized to indicate a status of the corresponding restraining system 18. For example, different shades, brightness, temperature, or colors of light may indicate different levels of engagement (e.g., a red light may indicate that there is no engagement of the restraining system 18, a purple light may indicate locking into securement for a large passenger 12, and orange may indicate locking into securement for a small passenger 12).

Furthermore, the restraining systems 18 may include any suitable locking mechanism 60. For example, the locking mechanism 60 may be a ratchet system that includes a gear that may rotate about a pawl, such that the gear and pawl are rotatably fixed to a base. The ratchet system may include a round gear with teeth such that the pawl may engage with the teeth to prevent the rotation of the restraining system 18 about the lateral axis 22 in a rotational direction 62. In an embodiment, the ratchet system may enable the restraining system to lock into different engagement positions, for example, as the overhead component 66 rotates in the rotational direction 62. That is, the restraining system may include a plurality of engagement positions along the rotational direction 62 for engaging the overhead component into the locked configuration.

In an embodiment, the locking mechanism 60 may be a hydraulic system that includes an actuated hydraulic pump and a hydraulic cylinder that may be activated to lock the restraining system 18 via a bolt assembly, for example, after the restraining system 18 moves a certain angular distance. Furthermore, the hydraulic pump may force hydraulic fluid that may drive a piston to engage a bolt to lock the restraining system 18. In an embodiment, when the restraining system 18 is locked (e.g., via the bolt), the controller 32 may cause the lighting system 50 corresponding to the locked restraining system 18 to emit the light 52 with suitable light characteristics.

In an embodiment, the locking mechanism 60 may include a series of solenoids and pins that may be electrically engaged into corresponding openings of the locking mechanism 60. The locking mechanism 60 may allow for a plurality of locking positions, allowing the restraining system 18 to secure a variety of passengers 12 with a wide range of body shapes and body sizes.

In an embodiment, the locking mechanism 60 includes an electromagnetic lock. The electromagnetic lock includes a locking device (e.g., that includes an electromagnet) and an armature plate. As such, in an embodiment, the locking mechanism 60 may be "fail secure" such that when the power to the locking mechanism 60 is lost the locking mechanism 60 may remain locked.

FIG. 4 depicts a perspective view of an embodiment of a ride vehicle 14 of the ride system 10 of FIG. 1 employing the restraining system 18 of FIG. 3 in an unlocked configuration, in accordance with aspects of the present disclosure. As mentioned above, the controller 32 may cause the lighting system 50 to not emit light when the controller 32 receives the first indication indicative of the restraining system 18 in the unlocked configuration. In another embodiment, the controller 32 may cause the lighting system 50 to change between colors (or other characteristics) depending upon the locking configuration (e.g., locked configuration or unlocked configuration) of the restraining system 18. For example, when the controller 32 determines that the restraining system 18 is in the unlocked configuration, the controller 32 may cause the corresponding lighting system 52 to emit light having a first set of characteristics (e.g., a first color, a first shade, a first brightness, a second shade, and a first temperature), and when the controller 32 determines that the restraining system 18 is in the locked configuration, the controller 32 may cause the corresponding lighting system 52 to emit light having a second set of characteristics (e.g., a second color, a second brightness, and a second temperature). In an embodiment, when the controller 32 determines that the restraining system 18 is in the unlocked configuration, the controller 32 may cause the lighting system 50 to not emit the light 52.

In an embodiment, when the controller 32 determines that the restraining system 18 is in the unlocked configuration, the controller 32 may cause the lighting system 50 to execute a first light scheme. For example, the first light scheme may include emitting a blinking red light. In an embodiment, the first light scheme may include emitting red light to serve as an indication that the restraining system 18 is in the unlocked configuration. Furthermore, when the controller 32 determines that the restraining system 18 is in the locked configuration, the controller 32 may cause the lighting system 50 to execute a second light scheme. For example, the second light scheme may include emitting green light (e.g., as an indication that the restraining system is in the locked configuration).

Figure 5:
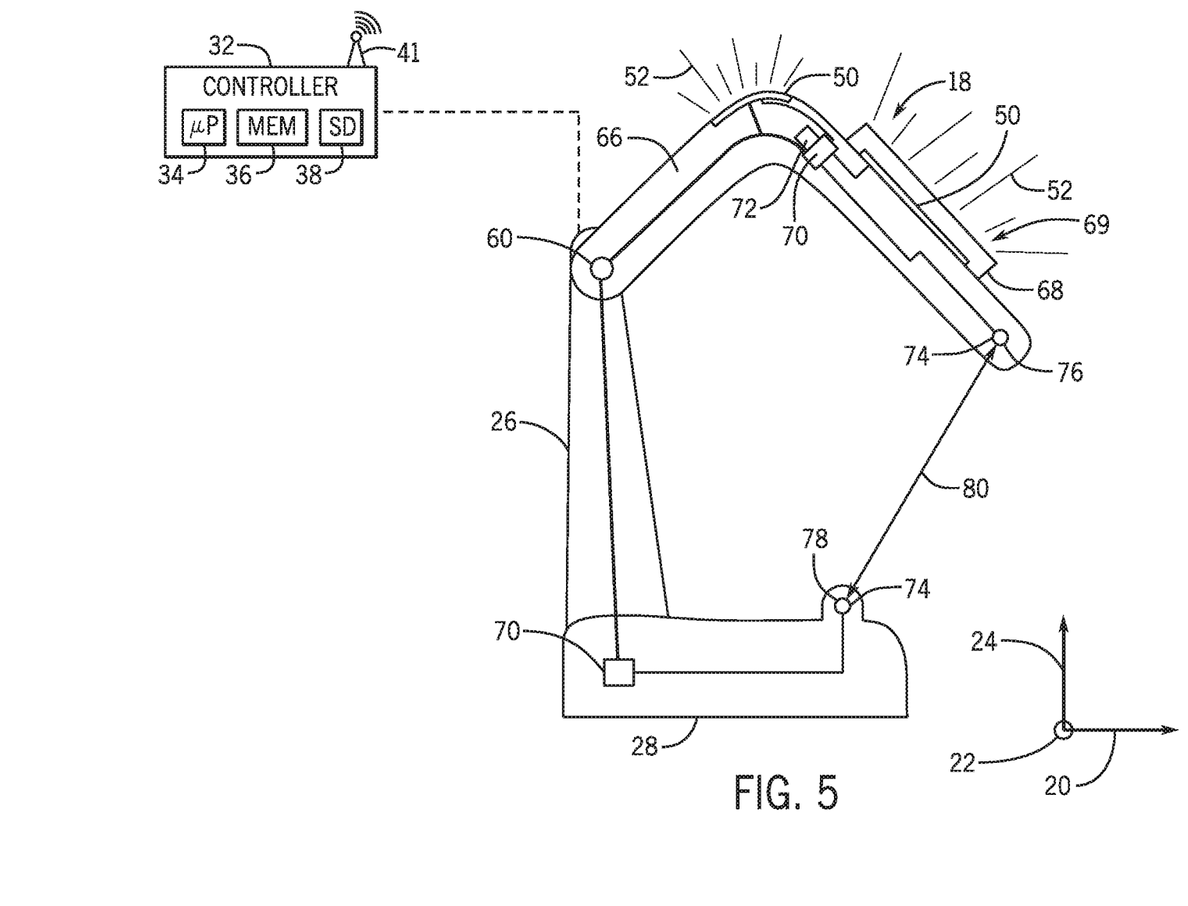
FIG. 5 depicts a schematic side view of an embodiment the restraining system of FIG. 3 employing an incorporated lighting system, in accordance with aspects of the present disclosure.

FIG. 5 depicts a side view of a schematic of an embodiment the restraining system 18 and its corresponding lighting system 50. More specifically, in an embodiment, the restraining system 18 includes an overhead component 66, the back rest 26, and the seat 28. Furthermore, as discussed above, the locking mechanism 60 (e.g., ratchet mechanism, hydraulic locking system, and/or magnetic locking system) may enable the restraining system 18 to alternate between the locked configuration and the unlocked configuration.

In an embodiment, the lighting system 50 is recessed into a slot 68 on the overhead component 66. In some instances, the slot 68 may filter some of the emitted light 52. For example, filtering the emitted light 52 may make looking at the emitted light 52 more comfortable (e.g., by not introducing glare and the like). In an embodiment, the slot 68 may include a filtering component that may change the light characteristics of the emitted light 52.

The slot 68 may include a screen 69 (e.g., a liquid crystal display) that may block the light 52. The screen 69 may be communicatively coupled with the controller 32, such that the screen 69 may open or closed based on instructions performed by the controller 32. For example, the screen 69 may close when the restraining system 18 is in the unlocked configuration, such that the lighting system 50 does not emit substantially detectable light 52, thereby providing a visual indication that the restraining system 18 is in the unlocked configuration. The screen 69 may open when the restraining system 18 is in the locked configuration, thereby allowing for emitted light 52 to be more easily detected. In an embodiment, the lighting system 50 may continuously dissipate light 52, but the light 52 may be only clearly visible (e.g., to park attendants) when the screen 69 is open.

In an embodiment, the restraining system 18 includes a transceiver 70 and a power source 72. The lighting system 50 may receive power from the power source 72. In an embodiment, the power source 72 is a battery. The power source 72 may be located at the front of the ride vehicle 14 to power all or a portion of the electrical components of the ride vehicle 14. It should be noted that each restraining system 18 may include a power source 72 that may power the corresponding components of the restraining system 18. In an embodiment, the power source 72 may be wirelessly charged, charged via regenerative braking, or charged via any suitable charging technique.

Furthermore, a proximity sensor set 74 may be powered by the power source 72. Data between the proximity sensor and the sensing component of the proximity sensor set 74 may be communicated via the transceiver 70. In an embodiment, the proximity sensor set 74 may be communicatively coupled to the controller 32 (e.g., via respective transceivers). In an embodiment, the proximity sensor set 74 includes a proximity sensor 76 on the overhead component 66 and a sensing component 78 on the seat 28. In an embodiment, the sensing component 78 may include an emitter for use in conjunction with the proximity sensor 76, such that the emitter emits a signal detected by the proximity sensor 76 used to engage the restraining system into a suitable engagement position. The proximity sensor set 74 may detect a signal indicative of the locked configuration when the restraint is in an engagement position. It should be noted that different arrangements may be used for this in different embodiments of the restraining system. For example, the sensing component may be a bar code, a magnet, or any suitable emitter that may be detected by the proximity sensor 76.

In an embodiment, the controller 32 may cause the locking mechanism 60 to lock or unlock based on data received from proximity sensor 76. For example, the controller 32 may receive a first set of sensor data indicative of the distance 80 between the proximity sensor 76 and the sensing component 78. In an embodiment, when the distance 80 is below a threshold value, the controller 32 may send a locking signal to the locking mechanism 60 to engaging the locking mechanism 60 into the locked configuration (e.g., a suitable engagement position to restrain the passenger). For example, when the proximity sensor 76 detects the sensing component 78 is in close proximity to the proximity sensor 76, the controller 32 may receive a signal indicative of this close proximity to engage the locking mechanism 60 in a suitable engagement position. In an embodiment, the controller 32 may also cause the lighting system 50 to emit the light 52 in response to engaging the locking mechanism 60 into the locked configuration. In an embodiment, the controller 32 may cause the lighting system 50 to emit the light 52 having a second set of characteristics in response to engaging the locking mechanism 60 into the locked configuration, which may also be detected by sensors (e.g. proximity sensor set 74). In an embodiment, the controller 32 may cause the lighting system 50 to execute a second light scheme in response to engaging the locking mechanism 60 into the locked configuration. As such, the lighting system 50 may emit light 52 as a result of the restraining system 18 being in the locked configuration.

When the distance 80 is greater than a threshold value, the controller 32 may not send the locking signal to the locking mechanism 60, such that the locking mechanism 60 is not engaged and remains in the unlocked configuration. In an embodiment, when the distance 80 is greater than a threshold value, the controller 32 may send an unlocking signal to the locking mechanism 60, such that the locking mechanism 60 is not engaged and remains in the unlocked configuration. However, it should be noted that the operator may engage the locking mechanism 60 into the locked configuration regardless of the distance 80. In an embodiment, the controller 32 may also cause the lighting system 50 to not emit the light 52 in response to maintaining the locking mechanism 60 in the unlocked configuration. As such, the lighting system 50 may not emit the light 52 as a result of the restraining system 18 being in the unlocked configuration. In an embodiment, the controller 32 may cause the lighting system 50 to emit the light 52 having the first set of characteristics in response to not engaging the locking mechanism 60 and maintaining the locking mechanism 60 in the unlocked configuration. In an embodiment, the controller 32 may cause the lighting system 50 to execute the first light scheme in response to not engaging the locking mechanism 60 and maintaining the locking mechanism 60 in the unlocked configuration.

Figure 6:
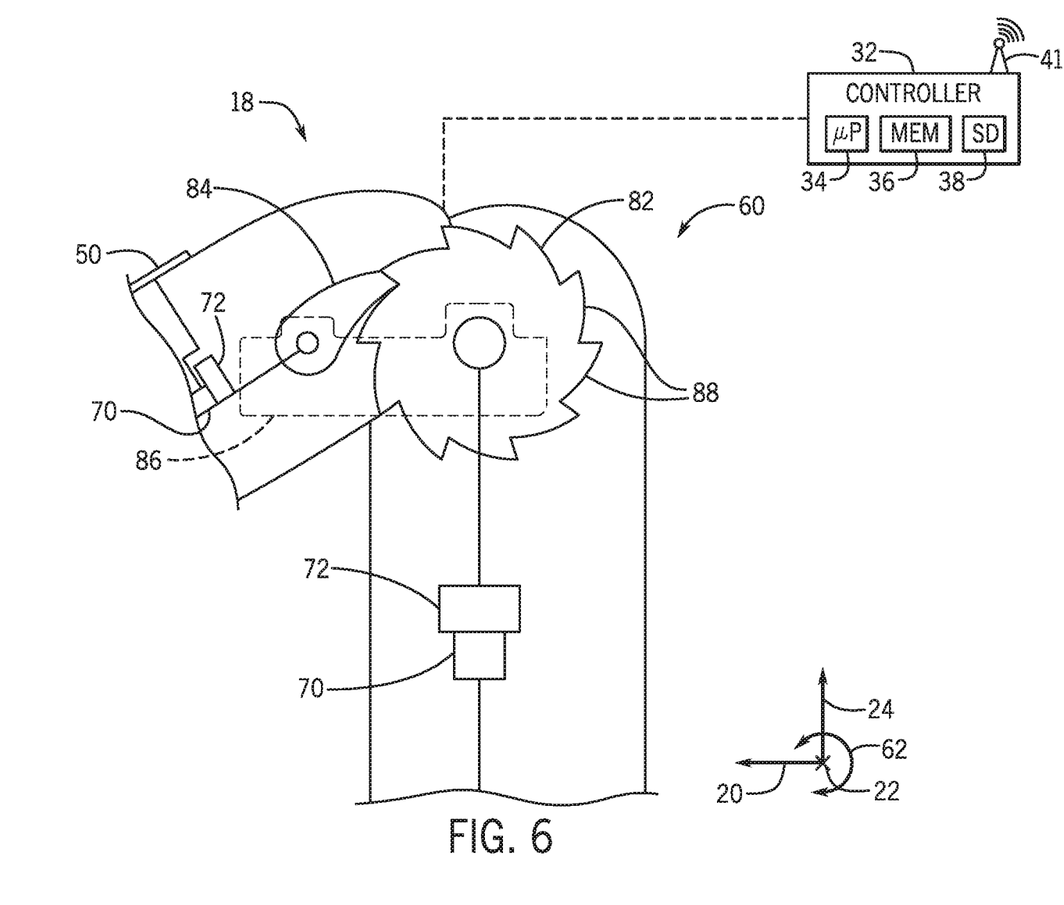
FIG. 6 depicts a schematic representation of an embodiment of a locking mechanism associated with the restraining system of FIG. 3, in accordance with an aspect of the present disclosure.

FIG. 6 depicts a schematic of an embodiment of a locking mechanism 60 associated with the restraining system 18 of FIG. 3, in accordance with aspects of the present disclosure. As discussed above, the locking mechanism 60 may be communicatively coupled to the controller 32, for example, via respective transceivers 70, 41. In an embodiment, the lighting system 50 is also communicatively coupled to the controller 32. In an embodiment, the locking mechanism 60 is a ratchet mechanism, which includes a ratchet system. The ratchet system may include a gear 82 that rotates about a pawl 84, such that the gear 82 and the pawl 84 are rotatably fixed to a base 86. In an embodiment, the gear 82 includes a plurality of teeth 88, such that the teeth 88 may engage with the pawl 84 to prevent the rotation of the overhead component 66 in the rotational direction 62 about the locking mechanism 60. The teeth 88 may include certain circuit features that are activated when the controller 32 engages the restraining system 18 into the locked configuration. Alternatively, the pawl 84 may be communicatively coupled to the controller 32, such that the pawl 84 may be actuated by the controller 32 to engage with the teeth 88 to prevent rotation of the restraining system 18, thereby engaging the restraining system 18 into the locked configuration.

When the controller 32 receives an indication that the restraining system 18 is in the unlocked configuration (or after the controller engages the restraining system into the unlocked configuration), the controller 32 may cause the lighting system 50 to operate in a certain manner, for example, to convey to the operators that the restraining system 18 is in the unlocked configuration. In addition, when the controller 32 receives an indication that the restraining system 18 is in the locked configuration, the controller 32 may cause the lighting system 50 to operate in another manner, for example, to convey to the operators that the restraining system 18 is in the locked configuration. It should be noted that while, in the illustrated embodiment, the locking mechanism 60 is a ratchet system, the locking mechanism 60 may be a hydraulic system, a series of solenoids and pins, an electromagnetic lock, among other suitable locking mechanisms. Furthermore, the restraining system 18 may incorporate any combination of these locking mechanisms into the ride vehicle 14.

Figure 7:
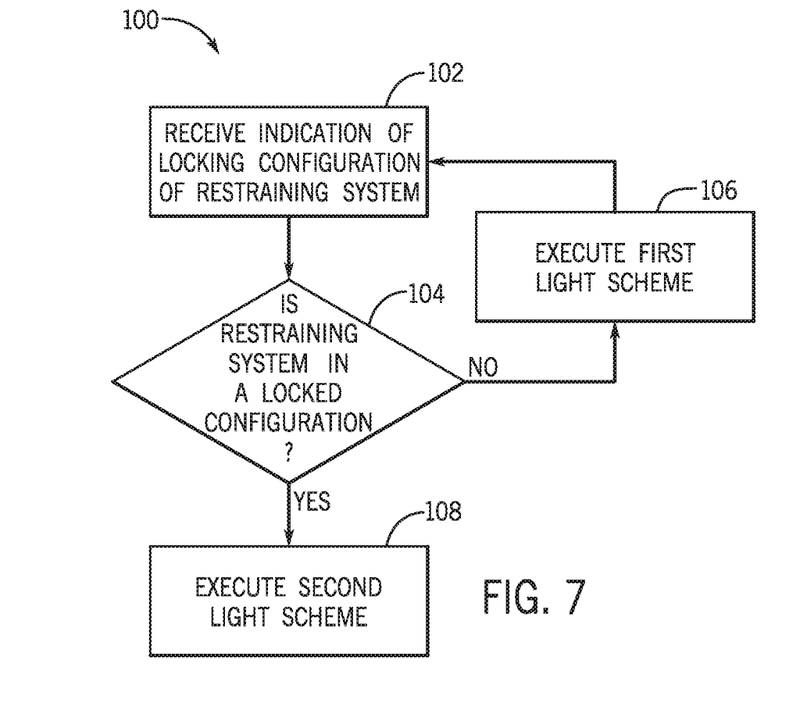
FIG. 7 depicts a flow diagram of a process whereby the light of the lighting system executes a light scheme, in accordance with aspects of the present disclosure.
Figure 8:
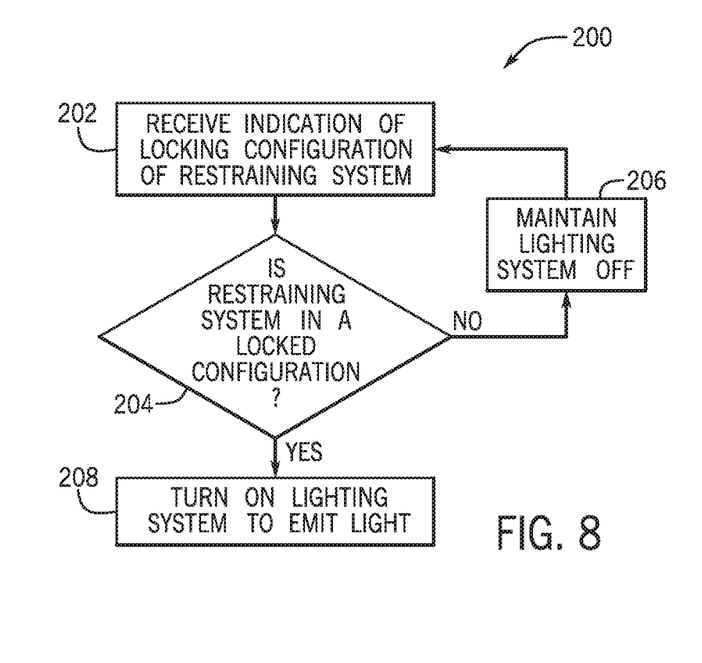
FIG. 8 depicts a flow diagram of a process whereby the light of the lighting system turns on or off, in accordance with aspects of the present disclosure.

FIGS. 7 and 8 depict flow diagrams 100, 200 of methods whereby the lighting system 50 (FIGS. 2-6) may execute a light scheme or activate the lighting system 50, respectively, in accordance with aspects of the present disclosure. As discussed below, the light scheme may be based on whether the restraining system 18 (FIGS. 1-6) is in the locked configuration or the unlocked configuration. In an embodiment, the lighting system 50 may receive an indication of the locking configuration of the restraining system 18 (process block 102, 202). The locking configuration of the restraining system 18 may be either locked or unlocked. In an embodiment, the controller 32 may receive the indication of the locking configuration of the restraining system 18 during the duration of the operation of the ride system 10 (FIG. 1) and while the ride system 10 is not in operation.

As mentioned above, in an embodiment, the restraining system includes a proximity sensor set 74 (FIG. 5) that includes a proximity sensor 76 (FIG. 5) on the overhead component 66 (FIG. 5) and a sensing component 78 (FIG. 5) on the seat 28 (FIGS. 2 and 5). The proximity sensor set 74 may also include sensors that detect lock engagement. In an embodiment, receiving an indication of the locking configuration of the restraining system 18 may include receiving an indication of the distance 80 (FIG. 5) between the proximity sensor 76 and the sensing component 78 (e.g., emitter). The controller 32 (FIG. 2-6) may engage the locking mechanism 60 into a locked configuration in response to the distance 80 being below a threshold value. In an embodiment, the controller 32 may still engage the locking mechanism into the locked configuration regardless of the distance 80. The controller 32 may instruct the locking mechanism to be engaged into the locked configuration and may receive an indication of the locking mechanism 60 being engaged into the locked configuration. That is, in an embodiment, the locking mechanism 60 may be engaged into the locked configuration in response to detecting that the proximity sensor set 74 is in close proximity to the passenger 12 (FIG. 1-2). The controller 32 may actuate the locking mechanism 60 into the locked configuration and receive an indication of the locking mechanism 60 being engaged into the locked configuration from other sensors of the sensor set 74. The locked configuration may include a variety of engagement positions to accommodate different passengers of varying body shapes and body sizes.

Furthermore, the restraining system 18 may include haptic sensors to detect the pressure the restraining system 18 exerts on the passenger 12. In an embodiment, when the pressure exceeds a pressure threshold value, the controller 32 may actuate the restraining system 18 to the locked configuration. The controller 32 may receive this indication of the locking mechanism 60 being engaged into the locked configuration.

After receiving an indication of the locking configuration of the restraining system 18, the controller 32 may determine whether the restraining system 18 is in a locked configuration (decision block 104, 204). In an embodiment, determining whether the restraining system 18 is in a locked configuration includes determining whether the locking mechanism 60 is engaged, such that it resists or prevents movement (e.g., rotational or translational) of the restraining system 18. When the locking mechanism 60 is engaged, the locking mechanism 60 may resist or prevent the movement of the overhead component 66, such that the movement of the passenger 12 is reduced. As discussed above, the locking mechanism 60 may include a ratchet system, a hydraulic system, a series of solenoids and pins, an electromagnetic lock, among other suitable locking mechanisms to enable locking and unlocking of the restraining system 18.

As discussed above, when the controller 32 determines that the restraining system 18 is not locked (e.g., in an unlocked configuration) the controller 32 may cause the lighting system 50 to execute a first light scheme (process block 106). For example, the first light scheme may include emitting a blinking red light. The emitted red light may serve as an indication, understood by the operator, that the locking mechanism 60 in in the unlocked configuration. In an embodiment, the first light scheme may include not emitting any light 52 (process block 206). As such, when the controller 32 determines that the restraining system 18 is not in a locked configuration, the controller 32 may maintain the lighting system off (process block 206), such that the lighting system 50 does not emit light 52 (FIGS. 3 and 5).

As described in detail above, when the restraining system 18 is in the locked configuration, the lighting system 50 may execute the second light scheme (process block 108). The second light scheme may include emitting a green light. In an embodiment, when the restraining system 18 is in the locked configuration, the lighting system 50 may turn on (process block 208) to emit light 52. In an embodiment, the light 52 may be emitted to provide a light show. In an embodiment, the light 52 may blink in synchronization with a rhythm of music playing around the ride vehicle 14. Furthermore, the first light scheme may include a light show that may start when the restraining system is locked and/or as the ride vehicle 14 starts moving. The light show may include a light display that may emit and display figures associated with the theme of the ride system 10.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:
1. A system, comprising:
a passenger restraining system comprising a restraint and a locking mechanism; and
a lighting system comprising a plurality of light sources, wherein at least a portion of the plurality of light sources is integrated with the restraint and wherein the lighting system is configured to:
receive an indication of a configuration of the locking mechanism,
execute a first light scheme via the plurality of light sources when the indication is of an unlocked configuration, and execute a second light scheme via the plurality of light sources when the indication is of a locked configuration.

2. The system of claim 1, wherein the passenger restraining system comprises a proximity sensor configured to detect a signal indicative of the locked configuration when the restraint is in an engagement position.

3. The system of claim 2, wherein the proximity sensor is integral with the restraint or the locking mechanism and configured to interact with a sensing component.

4. The system of claim 1, wherein the lighting system comprises a screen configured to be actuated to block or transmit light emitted from the plurality of light sources.

5. The system of claim 1, comprising a controller configured to process sensor data to determine the indication of the configuration of the locking mechanism and communicate the indication to the lighting system.

6. The system of claim 1, wherein the first light scheme comprises emitting light from the plurality of light sources, and wherein the second light scheme comprises not emitting the light from the plurality of light sources.

7. The system of claim 1, wherein the restraint of the passenger restraining system comprises an overhead restraining mechanism configured to pivot about an axis to fit over a head of a ride passenger, wherein the plurality of light sources are embedded in the overhead restraining mechanism.

8. The system of claim 1, wherein the system comprises a proximity sensor set comprising a sensing component configured to emit a signal detected by a proximity sensor of the proximity sensor set, wherein the signal is communicated to a controller to initiate the locking mechanism into the locked configuration when the sensing component and the proximity sensor are below a threshold distance away from each other.

9. The system of claim 1, wherein the locking mechanism is configured to block the restraint from rotating about the locking mechanism or configured to block the restraint from translating relative to the locking mechanism when the locking mechanism is in the locked configuration.

10. The system of claim 9, wherein the lighting system is configured to control light emission from the plurality of light sources based on the locking mechanism blocking the restraint from rotating about the locking mechanism or from translating relative to the locking mechanism.

11. A method, comprising:
receiving a locking indication from a restraining system of a ride vehicle, wherein the ride vehicle is configured to operate in a ride system;
determining whether the restraining system is in a locked configuration or an unlocked configuration based on the locking indication;
executing a first light scheme via a plurality of light emitters integrated with a restraint of the restraining system in response to determining that the restraining system is in the unlocked configuration; and
executing a second light scheme via the plurality of light emitters integrated with the restraint of the restraining system in response to determining the restraining system is in the locked configuration.

12. The method of claim 11, wherein receiving the locking indication comprises receiving data indicative of whether a pawl is engaged with a gear of the restraining system to prevent rotation of the restraining system.

13. The method of claim 11, wherein executing the first light scheme comprises emitting a pattern of light emissions.

14. The method of claim 11, wherein executing the second light scheme comprises continuously emitting a second light color different than a first light color of the first light scheme.

15. The method of claim 11, further comprising:
locking the restraining system prior to operating the ride system; and
unlocking the restraining system prior to passenger disengagement from the ride vehicle.

16. A control system, comprising:
a restraining system comprising a locking mechanism and a restraint;
a lighting system comprising a plurality of light sources integrated with the restraint of the restraining system; and
a controller, comprising:
one or more processors;
a memory device storing instructions, wherein the instructions when executed by the one or more processors are configured to cause the one or more processors to:
receive a locking indication of a locking configuration of the restraining system;
instruct the lighting system to execute a first light scheme, via the plurality of light sources, in response to determining that the restraining system is in an unlocked configuration based on the received locking indication; and
instruct the lighting system to execute a second light scheme, via the plurality of light sources, in response to determining that the restraining system is in a locked configuration based on the received locking indication.

17. The control system of claim 16, wherein the restraining system comprises a first transceiver configured to enable wireless communication of a first set of data indicative of the locking configuration to the controller.

18. The control system of claim 16, wherein the lighting system comprises a second transceiver configured to enable wireless communication of a second set of data indicative of an executed light scheme.

19. The control system of claim 16, wherein the first light scheme comprises blocking light emission.

20. The control system of claim 16, wherein the lighting system comprises a screen configured to open to allow light emitted from the plurality of light sources to be visible from the restraining system.

21. The system of claim 1, wherein executing the second light scheme comprises coordinating the second light scheme with a sound to indicate that the locking mechanism is engaged in the locked configuration.

22. The system of claim 21, wherein coordinating the second light scheme with the sound comprises blinking a light source of the plurality of light sources to the rhythm of music.

23. The system of claim 1, wherein the second light scheme comprises light emission commensurate with an entertainment theme of the system.

* * * * *